(12) United States Patent
Kwak et al.

(10) Patent No.: US 7,396,886 B2
(45) Date of Patent: Jul. 8, 2008

(54) PROCESS FOR MAKING COPOLYMERS OF MALEIC ANHYDRIDE AND ALKYL VINYL ETHER OF HIGH SPECIFIC VISCOSITY

(75) Inventors: Yoon Tae Kwak, Woodcliff Lake, NJ (US); Paul D. Taylor, Dublin, OH (US); William J. Swatos, Paducah, KY (US)

(73) Assignee: ISP Investments Inc., Wilmington, DE (US)

( * ) Notice: Subject to any disclaimer, the term of this patent is extended or adjusted under 35 U.S.C. 154(b) by 96 days.

(21) Appl. No.: 11/158,126

(22) Filed: Jun. 21, 2005

(65) Prior Publication Data

US 2006/0287452 A1 Dec. 21, 2006

(51) Int. Cl.
*C08F 138/02* (2006.01)

(52) U.S. Cl. .......................... 526/76; 526/79; 526/216; 526/271; 526/332; 526/916

(58) Field of Classification Search ................. 526/271, 526/332, 78, 79, 216, 916
See application file for complete search history.

(56) References Cited

U.S. PATENT DOCUMENTS 5,990,227 A * 11/1999 Takizawa et al. ............ 524/517

* cited by examiner

*Primary Examiner*—Robert D. Harlan
(74) *Attorney, Agent, or Firm*—Walter Katz; William J. Davis

(57) ABSTRACT

A process for making high specific viscosity copolymers of maleic anhydride and an alkyl vinyl either having as specific viscosity of at least 7, preferably 10-50, are made by copolymerizing maleic anhydride and an alkly vinyl ether monomers in the presence of added acetylene.

19 Claims, No Drawings

PROCESS FOR MAKING COPOLYMERS OF MALEIC ANHYDRIDE AND ALKYL VINYL ETHER OF HIGH SPECIFIC VISCOSITY

BACKGROUND OF THE INVENTION

1. Field of the Invention

This invention relates to a process for making a copolymer of maleic anhydride and an alkyl vinyl ether, and, more particularly, to a process for making such copolymers of advantageously high specific viscosity.

2. Description of the Prior Art

British Patent 906,230 described the preparation of copolymers of maleic anhydride and methyl vinyl ether in benzene as solvent. Example 1 also disclosed a copolymerization process in absence of solvent in which powdered maleic anhydride, methyl vinyl ether and initiator were precharged into an autoclave and reacted at 55° C. The specific viscosity (SV) of the product, however, was only 3.45 (1% in methyl ethyl ketone, MEK).

Other processes and copolymer products described previously included U.S. Pat. Nos. 4,952,558; 5,034,488; 5,047,490; 5,874,510; 6,624,271; 6,184,325; and Re 36,657.

However, none of these processes are suitable for making such copolymers of advantageously high specific viscosity (and, correspondingly, high molecular weights).

Accordingly, it is an object of this invention to provide a process for making copolymers of maleic anhydride and an alkyl vinyl ether having high specific viscosities.

A feature of this invention is a process for making such copolymers in which the copolymerization is carried out in the presence of added acetylene.

Another feature of the invention is the provision of copolymers of maleic anhydride and methyl vinyl ether having a specific viscosity of at least 7, preferably at least 10 (1% in MEK, 25° C.), uncrosslinked or crosslinked.

These and other objects and features of the invention will be made apparent from the following description.

SUMMARY OF THE INVENTION

What is provided herein are fine white powders of an alternating copolymer of maleic anhydride and a $C_1$-$C_4$ alkyl vinyl ether having a molecular structure $(A-B)_n$ where A is maleic anhydride and B is alkyl vinyl ether, and n is an integer indicative of its molecular weight, having a specific viscosity (SV) of at least 7, preferably at least 10 (1% wt./vol. in MEK, 25° C.).

As another feature of the invention, there is provided a process for making high specific viscosity copolymers of maleic anhydride and an alkyl vinyl ether, e.g. methyl vinyl ether (MVE) by copolymerizing maleic anhydride and the alkyl vinyl ether in the presence of added acetylene.

Preferably the process is carried out in a solvent, e.g. isopropyl acetate, cyclohexane, ethyl acetate, benzene and mixtures thereof, and said added acetylene is dissolved in the solvent.

Alternatively, the acetylene may be dissolved directly in said alkyl vinyl ether monomer.

Suitably, the process is carried out at about 40-90° C.

In this invention, the process is characterized in that the added acetylene is present in an amount sufficient to produce a copolymer having a specific viscosity (SV) of at least 7, preferably at least 10 (1%, wt./vol. in MEK, 25° C.).

In suitable embodiments of the invention, the maleic anhydride is added in isopropyl acetate as solvent, a portion of the MVE and solvent is precharged, a free radical initiator is present in an amount of about 0.01-0.5% by weight based on total monomers, and is preferably decanoyl peroxide.

Accordingly, the preferred process comprises precharging solvent and a portion of free radical initiator, optionally including alkyl vinyl ether, feeding alkyl vinyl ether and maleic anhydride, optionally in said solvent, adding acetylene into the precharge or into the reaction mixture, and copolymerizing the monomers in the presence of added acetylene while including successive portions of initiator thereto, to produce a copolymer of said monomers of predetermined high specific viscosity.

In another embodiment, the polymerization mixture is formed by precharging solvent and free radical initiator and a portion of alkyl vinyl ether monomer and added acetylene, separately feeding the rest of alkyl vinyl ether and maleic anhydride in solvent into the reaction mixture.

The copolymer herein can be crosslinked or uncrosslinked.

The product of the copolymerization process of the invention is a solution of the polymer in the solvent, generally with a solids content of about 12-60 wt. %. A suitable polymer may be provided as a powder by the step of removing the solvent from the solution.

DETAILED DESCRIPTION OF THE INVENTION

In accordance with the invention, there is provided herein an improved process for making copolymers of maleic anhydride (MA) and alkyl vinyl ether (AVE), e.g. methyl vinyl ether (MVE) of exceedingly high specific viscosity corresponding to high molecular weights. These advantageous results are obtained in this invention by carrying out the copolymerization in the presence of added acetylene.

The function of the acetylene during the polymerization is to enable the chains of the copolymer to grow substantially without being inhibited by chain termination agents, e.g. the free radical initiator. Generally the more acetylene is present in the reaction mixture the higher the specific viscosity (molecular weight) of the resultant copolymer. Usually the copolymerization is carried out in a solvent such as isopropyl acetate (IPAc), and the acetylene is dissolved in the solvent. Alternatively, the reaction may be solvent-free and the acetylene dissolved directly in the alkyl vinyl ether monomer. The maximum amount of acetylene made available during the reaction is the solubility of acetylene in the solvent and/or alkyl vinyl ether monomer.

In one embodiment, the process is carried out by precharging part of the MVE in IPAc in a reactor heated to about 40-90° C. and then feeding separate streams of (i) a solution of MA in IPAc, (ii) the rest of MVE, and (iii) free radical initiator dissolved in IPAc, into the reactor.

The added acetylene may be introduced into the precharged reactor, or, alternatively, during the polymerization. Preferably it is introduced directly into the precharged reactor. The maximum concentration of acetylene thus added is predetermined by the solubility of acetylene in the solvent and/or alkyl vinyl ether monomer. Suitable % by wt. of acetylene in the reaction mixture ranges from about 0.1 to 2%, by weight of the mixture, preferably about 0.4 to 1.8%. A concentration of acetylene of about 0.4% will provide a copolymer having an SV of 10 while a concentration of about 1.8% will provide a copolymer having an SV of 50.

The free radical initiator suitably may be, e.g. an acyl peroxide, such as diacetyl peroxide, dibenzoyl peroxide and dilauryl peroxide; a perester, such as tert-butyl perpivalate, and tert-butyl per-2-ethylhexanoate; a peroxide, such as decanoylperoxide a di-tert-butyl peroxide; a percarbonate, such as dicyclohexyl peroxydicarbonate; and an azo compound, such as 2,2'-azobisisobutyronitrile, 2,2'-azobis-(2,4-dimethyl-valeronitrile), 1,1'-azobis-(1-cyclohexanecarbonitrile) or dimethyl-2,2'-azobis-(isobutyrate). A preferred initiator is decanoyl peroxide.

The invention will now be described by reference to the following examples, in which.

Control (No Acetylene)

1. Charge 108.470 g of isopropyl acetate (IPAc) into 1-l Buchi reactor.
2. Purge Buchi reactor with nitrogen gas three times.
3. Add 60.421 mL (46.464 g) of MVE into the Buchi reactor.
4. Dissolve 78.464 g (60.450 ml) of MA in 78.00 g of IPAc at 50° C.
5. Transfer 78.464 g (60.450 ml) of MA in 78.00 g of IPAc into syringe pump 'A'.
6. The temperature of syringe pump 'A' is maintained at 50° C.
7. Charge 84.590 mL (65.0496 g) of MVE into syringe pump 'B'.
8. Buchi reactor is heated to 70° C. while agitating.
9. Monomers of MA and MVE in syringe pumps 'A' and 'B' respectively are fed for 5 hours.
10. 0.1255 g of Decanox-F initiator is dissolved in 60.0 g (60.1255 g=68.784 ml) of IPAc. One eight portion of each injection is scheduled as follows: 0 minute, 40 minutes, 80 minutes, 120 minutes, 160 minutes, 200 minutes, 250 minutes and 300 minutes. Each portion is 4.2996 ml (3.7579 g) mixture of the initiator. The total amount of injection is 30.0628 g (34.3968 ml).
11. When the monomer feeding is over, hold the temperature for 0.5 hours while agitating.
12. Add 93.5 g of IPAc to the reactor and cool it down to RT while agitating.
13. Check TPP test for unreacted MA. Cool the reactor down to RT if TPP test is negative.
14. The reaction is completed at this moment.
15. The MA/MVE copolymer had an SV of 3.423 (1% MEK, 25° C.).

Reaction Temperature: 70° C.
Maleic anhydride: 0.8 moles, specific gravity=1.298
Methyl vinyl ether: 1.92 moles, d=0.769 g/cc
Isopropyl acetate: 309.97 g b.p.=85~91° C., d=0.874 g/cc
Decanox-F initiator: 0.08% based on MA (or 0.0503% based on total monomers)
% Solids: 25.0%
% Solids during the reaction: 31.0%
Sub-total of monomers: 124.928 g
Grand total: 500.026 g
Expected max. pressure: 65 psi.

EXAMPLE 1

Invention Process

1. Charge 108.470 g of isopropyl acetate (IPAc) into 1-l Buchi reactor.
2. Purge Buchi reactor with nitrogen gas three times.
3. Add 60.421 mL (46.464 g) of MVE into the Buchi reactor.
4. Dissolve 78.464 g (60.450 ml) of MA in 78.00 g of IPAc at 50° C.
5. Transfer 78.464 g (60.450 ml) of MA in 78.00 g of IPAc into syringe pump 'A'.
6. The temperature of syringe pump 'A' is maintained at 50° C.
7. Charge 84.590 mL (65.0496 g) of MVE into syringe pump 'B'.
8. Buchi reactor is heated to 70° C. while agitating.
9. Monomers of MA and MVE in syringe pumps 'A' and 'B' respectively are fed for 5 hours.
10. 0.157 g of Decanox-F initiator is dissolved in 60.0 g (60.157 g=68.830 ml) of IPAc. One eighth portion of each injection is scheduled as follows: 0 minute, 40 minutes, 80 minutes, 120 minutes, 150 minutes, 160, 200, 250 minutes and 300 minutes. Each portion is 4.302 ml (3.7598 g) mixture of the initiator. The total amount of injection is 30.0785 g (34.4148 ml).
11. When the monomer feeding is over, hold the temperature for 0.5 hours while agitating.
12. Add 93.5 g of IPAc to the reactor and cool it down to RT while agitating.
13. Check TPP test for unreacted MA. Cool the reactor down to RT if TPP test is negative.
14. The reaction is completed at this moment. Yield 120.19.
15. The MA/MVE copolymer had an SV of 10.01.

Reaction Temperature: 70° C.
Maleic anhydride: 0.8 moles, specific gravity=1.298
Methyl vinyl ether: 1.92 moles, d=0.769 g/cc
Isopropyl acetate: 309.97 g b.p.=85~91° C., d=0.874 g/cc
Decanox-F initiator: 0.1% based on MA (or 0.062% based on total monomers)
% Solids: 25.0%
% Solids during the reaction: 31.0%
Sub total of monomers: 126.0065 g
Grand total: 500.026 g
Expected max. pressure: 65 psi.

EXAMPLE 2

The process of Example 1 was repeated using 1.684% of added ylene. The SV was 16.08.

EXAMPLE 3

The process of Example 1 was repeated using 1.17% of added acetylene. SV of the copolymer was 29.84. Yield 117 g.

EXAMPLE 4

The process of Example 1 was repeated using 1.48% of added acetylene. MA/MVE copolymer had an SV of 33.012.

EXAMPLE 5

The process of Example 1 was repeated using 1.784% of added acetylene. The SV was 50.867.

TABLE

| Ex. No. | Acetylene (Wt. %) | SV |
| --- | --- | --- |
| Control | — | 3.423 |
| 1 | 0.46 | 10.01 |
| 2 | 1.68 | 16.06 |
| 3 | 1.17 | 29.84 |
| 4 | 1.48 | 33.01 |
| 5 | 1.784 | 50.87 |

The high specific viscosity MA/MVE copolymers of the invention find particular application in personal care, pharmaceutical, agricultural, beverage and building materials products. An advantageous use of such polymers is as denture adhesives.

While the invention has been described with particular reference to certain embodiments thereof, it will be understood that changes and modifications may be made which are within the skill of the art. Accordingly, it is intended to be bound only by the following claims, in which:

What is claimed is:

1. A process for making copolymers of maleic anhydride and an alkyl vinyl ether which comprises copolymerizing maleic anhydride and said alkyl vinyl ether in the presence of added acetylene.

2. A process according to claim 1 which is carried out in a solvent.

3. A process according to claim 2 wherein said acetylene is dissolved in said solvent.

4. A process according to claim 1 in which said acetylene is dissolved in said alkyl vinyl ether.

5. A process according to claim 2 wherein said solvent is isopropyl acetate, cyclohexane, ethyl acetate, benzene or mixtures thereof.

6. A process according to claim 1 which is carried out at about 40-90° C.

7. A process according to claim 1 wherein said acetylene is present in an amount sufficient to produce a copolymer having a specific viscosity (SV) of at least 7 at 1%, wt./vol. in MEK, 25° C.

8. A process according to claim 2 wherein said maleic anhydride is added in isopropyl acetate as solvent.

9. A process of claim 2 wherein a portion of said alkyl vinyl ether and solvent is precharged before the start of copolymerization.

10. A process according to claim 1 wherein a free radical initiator is present in an amount of about 0.01-0.5% by weight based on total monomers.

11. A process according to claim 7 wherein said SV is at least 10.

12. A process according to claim 1 wherein said alkyl vinyl ether is methyl vinyl ether.

13. A process according to claim 7 comprising (a) precharging solvent and a portion of a free radical initiator said precharge optionally including said alkyl vinyl ether, (b) feeding said alkyl vinyl ether and maleic anhydride, optionally feeding them in said solvent, (c) adding acetylene into the precharge or into the reaction mixture, and (d) copolymerizing the monomers including successive portions of said initiator thereto, and, in the presence of said acetylene, to produce a copolymer of said monomers of predetermined molecular weight.

14. A process according to claim 13 comprising precharging solvent and free radical initiator and a portion of said alkyl vinyl ether monomer and added acetylene, separately feeding the rest of the alkyl vinyl ether, and maleic anhydride in solvent, into the reaction mixture.

15. A process according to claim 14 wherein the solvent is isopropyl acetate, and the free radical initiator is present in an amount of 0.01-0.5% by weight based on total monomers.

16. A reaction product of the process of claim 1 which has a solids content of 12-60 wt. %.

17. A solution made according to the process of claim 1.

18. A powder made according to the process of claim 1 followed by the step of removing the solvent from the solution.

19. Powders made according to the process of claim 18 which has have an SV of at least 10.

* * * * *